United States Patent
Chen et al.

(10) Patent No.: US 7,982,412 B2
(45) Date of Patent: Jul. 19, 2011

(54) LED CIRCUIT WITH HIGH DIMMING FREQUENCY

(75) Inventors: Tyng-Yang Chen, Sinshih Township, Tainan County (TW); Aung Aung Yinn, Sinshih Township, Tainan County (TW); Chow-Peng Lee, Sinshih Township, Tainan County (TW)

(73) Assignee: Himax Analogic, Inc. (TW)

( * ) Notice: Subject to any disclaimer, the term of this patent is extended or adjusted under 35 U.S.C. 154(b) by 353 days.

(21) Appl. No.: 12/340,363

(22) Filed: Dec. 19, 2008

(65) Prior Publication Data

US 2010/0156320 A1   Jun. 24, 2010

(51) Int. Cl.
*H05B 37/02* (2006.01)
(52) U.S. Cl. .............. 315/307; 315/185 R; 315/225; 315/297
(58) Field of Classification Search .......... 315/185 R, 315/209 R, 224–226, 291, 294, 297, 307–308, 315/312, 360
See application file for complete search history.

(56) References Cited

U.S. PATENT DOCUMENTS

| | | | | |
|---|---|---|---|---|
| 7,145,295 B1* | 12/2006 | Lee et al. | | 315/291 |
| 7,759,881 B1* | 7/2010 | Melanson | | 315/307 |
| 7,855,520 B2* | 12/2010 | Leng | | 315/307 |
| 2008/0018261 A1* | 1/2008 | Kastner | | 315/192 |
| 2008/0074058 A1* | 3/2008 | Lee et al. | | 315/291 |
| 2008/0150449 A1* | 6/2008 | Wang et al. | | 315/291 |
| 2008/0204395 A1* | 8/2008 | Kang et al. | | 345/102 |
| 2009/0009105 A1* | 1/2009 | Sakurai | | 315/291 |
| 2009/0295298 A1* | 12/2009 | Chen et al. | | 315/185 R |
| 2011/0043134 A1* | 2/2011 | Lee | | 315/294 |

* cited by examiner

*Primary Examiner* — Douglas W Owens
*Assistant Examiner* — Tung X Le
(74) *Attorney, Agent, or Firm* — Hayes Soloway P.C.

(57) ABSTRACT

A LED circuit comprises: an inductor, a group of LEDs, a capacitor, a power MOS and a switching circuit. The inductor is connected to a voltage supply and a first node; the group of LEDs is connected to the first node and a ground potential; the capacitor is connected to the first node and a ground potential; the power MOS is connected to the first node and a ground potential, wherein the gate of the power MOS receives a switching signal such that the capacitor is charged when the power MOS is turn on to further turn on the LEDs and the capacitor is discharged when the power MOS is turn off to turn off the LEDs. The switching circuit is to generate the switching signal.

8 Claims, 3 Drawing Sheets

US 7,982,412 B2

LED CIRCUIT WITH HIGH DIMMING FREQUENCY

BACKGROUND

1. Field of Invention

The present invention relates to a LED circuit. More particularly, the present invention relates to a LED circuit with high dimming frequency.

2. Description of Related Art

LEDs are estimated to be four times as efficient as conventional incandescent lights. They are also claimed to be more economically sound than compact fluorescent bulbs that contain harmful mercury and are supposed to last a lot longer than the conventional lighting. Thus, LEDs may become the mainstream of the lighting technology.

A conventional driver of the LED circuit operates at a frequency lower than 1 KHz. Due to the low operation frequency, people can hear the noise of the vibration generated by the LED circuit. Therefore, it's suitable to make the operation frequency higher. However, it's hard to maintain the linearity relationship between the current of the LEDs and the dimming signal of the driver when the frequency of the dimming signal is higher. The loss of the linearity makes the brightness of the LED circuit lower, which is an undesirable result.

Accordingly, what is needed is a LED circuit that works under high frequency without losing the linearity to keep the brightness appropriate to overcome the above issues. The present invention addresses such a need.

SUMMARY

A LED circuit is provided. The LED circuit comprises: an inductor, a group of LEDs, a capacitor, a power MOS and a switching circuit. The inductor is connected to a voltage supply and a first node; the group of LEDs is connected to the first node and a ground potential; the capacitor is connected to the first node and a ground potential; the power MOS is connected to the first node and a ground potential, wherein the gate of the power MOS receives a switching signal such that the capacitor is charged when the power MOS is turn on to further turn on the LEDs and the capacitor is discharged when the power MOS is turn off to turn off the LEDs. The switching circuit is to generate the switching signal, wherein the switching circuit comprises a control module to receive a dimming signal having an active period and an inactive period to generate a control signal according to the dimming signal; an error amplifier to generate an error signal according to the dimming signal from the control module; and a pulse width modulator to compare the error signal and a reference signal to generate a compare result, the control signal controls the pulse width modulator to turn on when the dimming signal is in the active period and to turn off when the dimming signal is in the inactive period, wherein the switching signal turns on the power MOS during the active period according to the compare result and turns off the power MOS during the inactive period.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
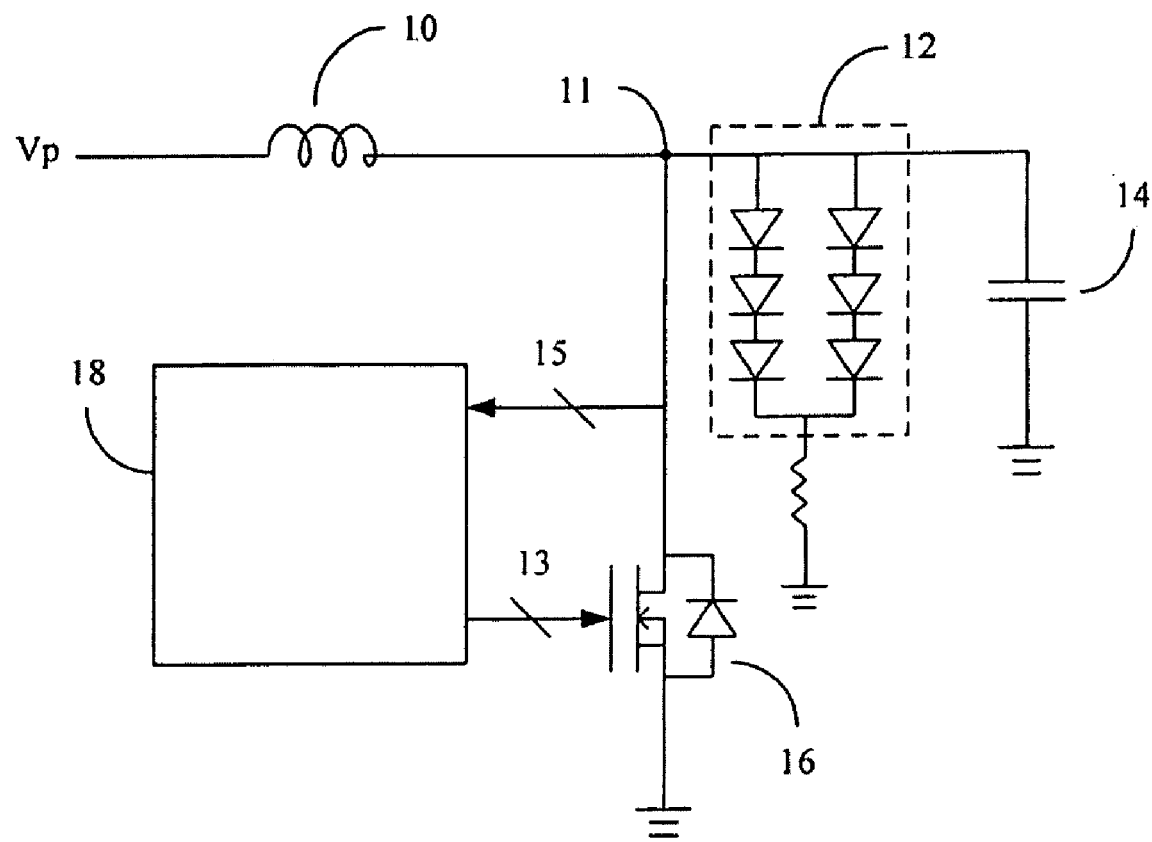
FIG. 1 is circuit diagram of a LED circuit of the first embodiment of the present invention.

Reference will now be made in detail to the present embodiments of the invention, examples of which are illustrated in the accompanying drawings. Wherever possible, the same reference numbers are used in the drawings and the description to refer to the same or like parts.

Please refer to FIG. 1, a LED circuit 1 of the first embodiment of the present invention. The LED circuit 1 comprises: an inductor 10, a group of LEDs 12, a capacitor 14, a power MOS 16 and a switching circuit 18. The inductor is connected to a voltage supply Vp and a first node 11. The group of LEDs 12 is connected to the first node 11 and a ground potential. The capacitor 14 is connected to the first node 11 and a ground potential. The power MOS 16 is connected to the first node 11 and a ground potential, wherein the gate of the power MOS 16 receives a switching signal 13 such that the capacitor 14 is charged when the power MOS 16 is turn on to further turn on the LEDs 12 and the capacitor 14 is discharged when the power MOS 16 is turn off to turn off the LEDs 12. The switching circuit 18 generates the switching signal 13 to control the switching of the power MOS 16 to make the LEDs 12 turns on and off in a predetermined frequency. If the predetermined frequency is low, then the elements in the LED circuit 1 may generate an undesirable noise that human ear hear due to the vibration of these elements.

Figure 2:
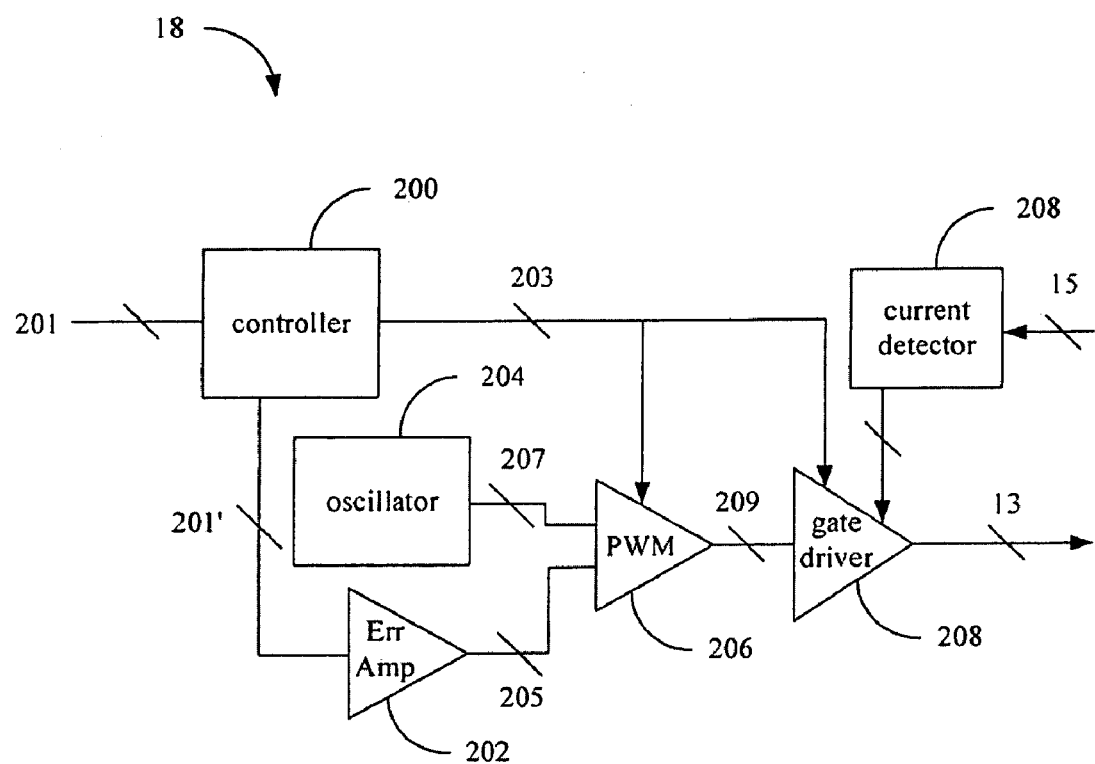
FIG. 2 is a circuit diagram of the switching circuit of the first embodiment of the present invention.

Please refer to FIG. 2, a circuit diagram of the switching circuit 18 of the first embodiment of the present invention. The switching circuit 18 comprises a control module 200, an error amplifier 202, an oscillator 204, a pulse width modulator 206, a gate driver 208 and a current detector 210. The control module 200 receives a dimming signal 201 having an active period and an inactive period to generate a control signal 203 according to the dimming signal 201. The dimming signal 201 is substantially a high frequency square wave, wherein the frequency is over 30 KHz. The error amplifier 202 generates an error signal 205 according to the dimming signal 201', which is the dimming signal 201 with a lower voltage level, from the control module 200. The oscillator 204 generates a reference signal 207 with a saw-tooth waveform. The pulse width modulator 206 compares the error signal 205 and the reference signal 207 to generate a compare result, wherein the error signal 205 is also a voltage reference for the pulse width modulator 206. The control signal 203 generated by the control module 200 controls the pulse width modulator 206 to turn on when the dimming signal 201 is in the active period and to turn off when the dimming signal 201 is in the inactive period. Therefore, a switching signal 13' generated by the pulse width modulator 206 turns on the power MOS 16 during the active period according to the compare result and turns off the power MOS 16 during the inactive period. In other words, the switching signal 13' is used to drive the power MOS 16 and setting a duty cycle for the LEDs 12 to determine the brightness of the LEDs 12.

The gate driver 208 connects between the pulse width modulator 206 and the power MOS 16 in FIG. 1 to strengthen the driving ability of the switching signal 13' to become the switching signal 13 with a higher voltage level to turn on the power MOS 16. Likewise, the control signal 203 controls the gate driver 208 to turn on when the dimming signal 201 is in the active period and to turn off when the dimming signal 201 is in the inactive period. It's noticed that the gate driver 208 is not necessary when the driving ability of the switching signal 13' is strong enough. The current detector 210 connects to the first node 11 as depicted in FIG. 1 to receive and detect a current 15 of the power MOS 16, wherein the current detector 210 turns off the gate driver 16 when the current value is larger than a predetermined value. The inductor 10 may be damaged if the current 15 is too large, thus the current detector 210 provides a protection mechanism.

Figure 3:
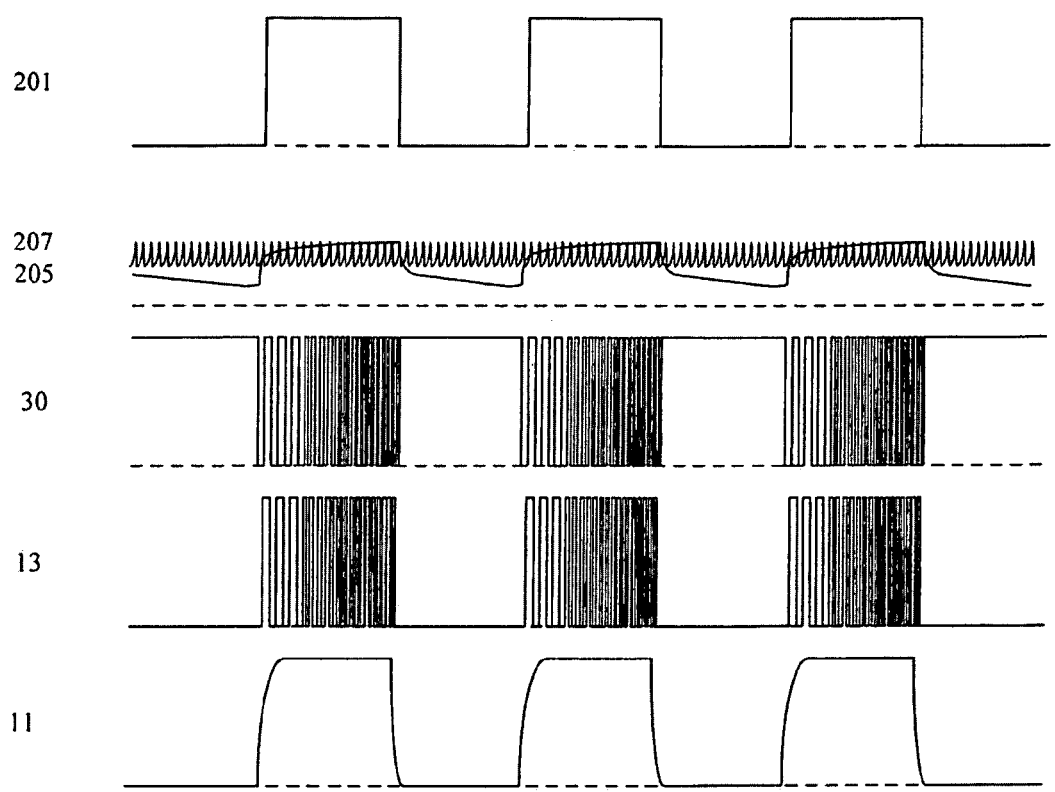
FIG. 3 is a diagram of the waveform of the dimming signal, the error signal, the reference signal, the compare result, the switching signal and the voltage of the first node.

FIG. 3 is a diagram of the waveform of the dimming signal 201, the error signal 205, the reference signal 207, the compare result 30, the switching signal 13 and the voltage of the first node 11. As described above, the dimming signal 201 is a square wave. The error signal 205 generated from the dimming signal 201 and the reference signal 207 generated from the oscillator 204 are compared in the pulse width modulator 206 to generate the compare result 30. The control signal 203 turns on the pulse width modulator 206 and the gate driver 208 to allow the compare result 30 transferring to the power MOS 16 and turns off the pulse width modulator 206 and the gate driver to halt the transferring. Thus, after the controlling of the control signal 203, the compare result 30 becomes the switching signal 13. The capacitor 14 is thus charged when the power MOS 16 is turn on to further turn on the LEDs 12 and the capacitor 14 is discharged when the power MOS 16 is turn off to turn off the LEDs 12. The charging current at the first node 11 is depicted in FIG. 3.

In a conventional design of the switching circuit, i.e. the driver of the LEDs, the whole switching circuit turns off during the inactive period of the dimming signal. Therefore, during the active period of the dimming signal, the whole circuit needs to restart to charge the LEDs. The startup process of the whole circuit, especially the error amplifier and the oscillator, is too slow to charge the LEDs in a high frequency dimming condition and the slow charging activity results in insufficient brightness of the LEDs. In the present invention, only the pulse width modulator 206 and the gate driver 208 are turned off during the inactive period. Thus, the error amplifier and the oscillator keep providing the error signal 205 and the reference signal 207 during the inactive period to generate the compare result. The only difference between the active and inactive period is that during the active period, the compare result is allowed to transfer from the pulse width modulator 206 to the power MOS 16. Thus, even in an extreme high frequency condition (over 30 KHz), the switching process is fast enough to charge the LEDs to have sufficient brightness.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A LED circuit comprises:
    an inductor connected to a voltage supply and a first node;
    a group of LEDs connected to the first node and a ground potential;
    a capacitor connected to the first node and a ground potential;
    a power MOS connected to the first node and a ground potential, wherein the gate of the power MOS receives a switching signal such that the capacitor is charged when the switching signal turns on the power MOS turn on the LEDs and the capacitor is discharged when the switching signal turns off the power MOS to turn off the LEDs; and
    a switching circuit to generate the switching signal comprising:
        a control module to receive a dimming signal having an active period and an inactive period to generate a control signal according to the dimming signal;
        an error amplifier to generate an error signal according to the dimming signal from the control module; and
        a pulse width modulator to compare the error signal and a reference signal to generate a compare result, the control signal controls the pulse width modulator to turn on when the dimming signal is in the active period and to turn off when the dimming signal is in the inactive period, wherein the switching signal turns on the power MOS during the active period according to the compare result and turns off the power MOS during the inactive period.

2. The LED circuit of claim 1, wherein the switching circuit further comprising a gate driver connected between the pulse width modulator and the power MOS to strengthen the driving ability of the switching signal to turn on the power MOS.

3. The LED circuit of claim 1, wherein the control signal controls the gate driver to turn on when the dimming signal is in the active period and to turn off when the dimming signal is in the inactive period.

4. The LED circuit of claim 1, wherein a frequency of the dimming signal is over 30 KHZ.

5. The LED circuit of claim 1, wherein the switching circuit further comprises a current detector connected to the first node to detect a current of the power MOS, wherein the current detector turns off the gate driver when the current value is larger than a predetermined value.

6. The LED circuit of claim 1, wherein the switching circuit further comprises an oscillator to generate the reference signal.

7. The LED circuit of claim 1, wherein the reference signal is a saw-tooth waveform.

8. The LED circuit of claim 7, when the value of the error signal is larger than the reference signal, the compare result is a low voltage output, and when the value of the error signal is smaller than the reference signal, the compare result is a high voltage output.

* * * * *